United States Patent [19]

Adams et al.

[11] Patent Number: 5,659,743

[45] Date of Patent: Aug. 19, 1997

[54] METHOD AND APPARATUS FOR A PATTERN BASED SPACED MANAGEMENT SYSTEM

[75] Inventors: John J. Adams, Vienna; Clark Kidd, Sterling, both of Va.; Timothy Summers, Allison Park, Pa.

[73] Assignee: Legent Corporation, Pittsburgh, Pa.

[21] Appl. No.: 349,618

[22] Filed: Dec. 5, 1994

[51] Int. Cl.⁶ .................................................. G06F 17/30
[52] U.S. Cl. ........................................................ 395/621
[58] Field of Search .................................. 395/600, 460, 395/464, 621

[56] References Cited

U.S. PATENT DOCUMENTS

| | | | |
|---|---|---|---|
| 5,018,060 | 5/1991 | Gelb et al. | 395/621 |
| 5,155,835 | 10/1992 | Belsan | 395/441 |
| 5,276,860 | 1/1994 | Fortier et al. | 395/182.04 |
| 5,276,867 | 1/1994 | Kenley et al. | 395/600 |
| 5,305,389 | 4/1994 | Palmer | 395/464 X |
| 5,325,505 | 6/1994 | Hoffecker et al. | 395/600 |
| 5,367,637 | 11/1994 | Wei | 395/250 |
| 5,367,698 | 11/1994 | Webber et al. | 395/800 |
| 5,403,639 | 4/1995 | Belsan et al. | 395/621 |
| 5,452,440 | 9/1995 | Salsburg | 395/463 |
| 5,454,099 | 9/1995 | Myers et al. | 395/182.04 |

OTHER PUBLICATIONS

Rich Olcott, *Behavior of Data in a Pooled Storage Environment*, CMG Transactions, Fall 1990, pp. 81–93.

Rich Olcott, *Workload Characterization For Storage Modeling*. (no source, no date).

Jack Brey & Dick Dreke, *The Benefits of the Diagonal Line Modeling HSM Migration Using an Unconventional Approach*. (no source, no date).

*Dataset Access Patterns and Migration Thresholds*, Mark Friedman on Storage Management, vol. 1, No. 3, Mar. 1993, Demand Technology, Inc.

*Primary Examiner*—Wayne Amsbury
*Attorney, Agent, or Firm*—Kirkpatrick & Lockhart LLP

[57] ABSTRACT

A pattern based space management apparatus and method for a computer system having at least two levels of hierarchical storage is comprised of computer code for creating and maintaining a data base containing size information and historical information about the use of data sets residing on the computer system. Code is provided for calculating a next reference date for certain of the data sets and a confidence level for each of the next reference dates from information in the data base. An input device may be used to define an amount of the highest level storage space which is to remain available. Code is provided for identifying which data sets should be migrated between the storage levels of the computer system based on the next reference dates, the confidence levels, the sizes of the data sets, and the amount of highest level storage space which is to remain available. Code is also provided to effect the migration of the data sets identified for migration.

19 Claims, 3 Drawing Sheets

METHOD AND APPARATUS FOR A PATTERN BASED SPACED MANAGEMENT SYSTEM

BACKGROUND OF THE INVENTION

1. Field of the Invention

The present invention is directed generally to the management of direct access storage devices (DASD) and more particularly to a method and apparatus for controlling the migration of files in a computer system amongst different levels of storage.

2. Description of the Invention Background

All organizations that use computers are faced with the challenge of managing the data that are generated by the users of those computers. Everyone that uses a computer on a regular basis knows that it's only a matter of time until the computer's disk storage is filled with a flood of memos, spreadsheets, schedules, proposals, letters, data bases, electronic books, sound files, and any other possible item known to mankind that can be stored in electronic form. That problem is compounded by software that often creates files without the knowledge of the user. This explosion of data results in the eventual inability to create new data, as all the available disk storage space has been exhausted. Having long given up hope that users will manage their own files, and not having an unlimited budget for buying disk storage, most computer managers have turned to archival software to solve this problem, or at least delay the purchase of more disk storage.

Most computer systems maintain the date that a particular file was last accessed (LASTDATE). Archival software uses that date to determine which files have not been used for a while and should be archived or removed to make way for new data requirements and application growth. When the archival software determines that a file is "old enough", it assumes it will either no longer be used or at least that it is unlikely to be needed again. Typically, the first action is to move or "archive" the file from its current location to a new location, "lower" in the storage hierarchy and usually considered a less "expensive" location. This action is also referred to as migration.

Most archival products maintain files at multiple levels of a storage hierarchy:

Primary storage is disk storage where the most active files are kept. Users can access files here with no delay, but it is the most "expensive" type of storage. To the degree that primary storage is littered with files that have not been referenced for significant periods, it can be said that some percentage of primary storage is being wasted. In our implementation, primary storage is also known as migration level 0, storage level (ML0).

Compressed storage also resides on disk, but contains multiple compressed and consolidated files. While this compression makes the storage less expensive, users accessing the files stored here must wait while the data are uncompressed and moved back to primary storage. While most archival systems do this automatically when the user attempts to access the data, there is still a short delay. In our implementation, this storage is also known as migration level 1, storage level (ML1).

Offline storage resides on tape and is inexpensive to buy, but difficult to access. When users attempt to access a file that has been moved to offline storage, they must wait while a tape is mounted and the data are moved back to primary storage. While this process is also automated, the delays can be greater. In our implementation, this storage is also known as migration level 2, storage level (ML2).

It becomes clear that the essence of the problem quickly boils down to the question, which files should be archived, or how "old" is "old-enough"?

Because the operating system keeps track of the last reference date (LASTDATE) any inspection of any group of files allows for an easy computation of the AGE of a data set. That is, we define the AGE of the data set as the number of days since it was last referenced or:

AGE=LASTDATE–TODAY's DATE

All known techniques for space management are based on some form of what we will call parameter-based rules. Those rules are based on a common least-recently used (LRU) algorithm. That is, the set of parameters governing the choices made by the archival (space management) software are centered around the rule of moving the least recently referenced data files. More specifically, a rule is established that states that any data set that has an age greater than "n" days should be migrated from ML0 to ML1.

Because of the uncertainty in choosing a value for "n", the data movement is typically restricted to the nearest level of the storage hierarchy (ML1). Hence, the inactive data set is 'staged' on ML1 where it will be poised for a relatively quick and "pain-free" recall to primary (ML0) or will continue to "age".

Because ML1 is a finite resource that requires its free space to be managed, a corresponding rule is set forth for residency on ML1. In the general case, any data set on ML1 that has an age greater than "m" days should be migrated from ML1 to ML2. Thus, a general rule for migration "policy" parameters can be represented by a set of two numbers (n, m). A data set is said to be eligible to be migrated if its age meets the criteria specified in the rules.

It is highly unlikely that one policy is ever satisfactory for a given DASD "farm" because of the wide diversity of application data and user constituencies. The lack of sufficient granularity in such a policy leads to gross inequities. Likewise, the lack of sufficient granularity or distinctions in migration policy leads to a variety of system inefficiencies caused by "bad" decisions. Inevitably, a set of policies or rules emerges to address perceived differences in the data residency requirements.

In IBM's System Managed Storage (SMS) scheme, the set of rules is composed of a series of management class (MGMTCLAS) rules. Each MGMTCLAS name represents a set of rules with which the archival software (i.e. in this case, IBM's product DFSMShsm or "HSM") will operate. The MGMTCLAS rule establishes whether a given data set is eligible to be migrated. The essence of the MGMTCLAS concept is depicted in the following table of examples:

| MGMTCLAS | "n" | "m" | Backup Criteria |
|---|---|---|---|
| STANDARD | 20 | 40 | BC1 |
| SPECIAL1 | 20 | 40 | BC2 |
| SPECIAL2 | 20 | 0 | BC1 |
| SPECIAL3 | 5 | 60 | BC1 |
| etc. | | | |

Note that "BC1" represents some policy for incremental backup of files. It is important to see that the only difference between STANDARD and SPECIAL1 is a different backup policy (BC2). The influence of the backup policy will be underscored later.

There are a number of problems associated with parameter-based schemes like the MGMTCLAS scheme sketched above. Difficulties in choosing parameter values for "n" and "m".

One aspect of the dilemma is that if one sets the minimum migration age too low, that "aggressive" policy will cause too many files to be eligible for migration which can lead to "thrashing"—the unproductive movement of data files down and up in the storage hierarchy. Thrashing is an inefficient use of system resources and contributes to application delay and end-user frustration. The other aspect of this dilemma is that if one sets the minimum migration age too high, that "conservative" policy will waste space on primary DASD by allowing inactive files to reside there too long. That leads to exposure to free-space shortages and other problems for both the storage administrators and end-users. Ultimately, it can lead to the acquisition of more DASD hardware to relieve the constraints caused by such waste.

Difficulties in assigning MGMTCLAS rules to data sets.

Item 1 above describes the "definition" side of the problem. This item describes the "assignment" side of the same problem. That is, given that some arbitrary value(s) have been defined for MGMTCLAS, which data sets should be assigned to management class x, which should be assigned to management class y, etc? In other words, what scheme is used to take the total population of data sets (i.e. files) and assign them with an appropriate "policy" in the form of a MGMTCLAS rule.

In IBM's implementation of this aspect of storage management, a component called the "ACS routine" makes that assignment. Typically, such code is not very ambitious for a variety of reasons. It tends to start with an assignment of all data sets to some 'standard' class and then deviate with assignments to 'special' classes on an exception basis as needed, over time. The main distinction is some identification based on the name of the data set.

Failure to Consider File Size Properly.

Once a data set (file) is eligible to be migrated based on its age, it may be migrated no matter how small it is. Very small data sets do little to alleviate space occupancy conditions on a primary volume because only a small amount of space is being freed up. Yet if relatively small data sets find their way out to the ML2 layer of the storage hierarchy, they are exposed to the risk of needing to be recalled. The manual steps of locating a tape cartridge to service a demand recall for a small data set combined with the manual steps of refiling that tape in the tape library make this something that is simply not worth the risk. The data transfer time is negligible once the data is ready to be read (i.e. the tape mount is satisfied) and yet the application delay time and/or user frustration caused by such a wait for recall is significant. It is therefore simply not worth it to expose relatively small data sets to the risk of being recalled. IBM algorithms only consider space within a set of data sets with the same age. To view the inefficiency in such a scheme, consider the following simple table of examples which illustrate how small data sets are exposed to the risk of needing to be recalled (assumes AGE must be 15 or greater to be eligible):

| Age | Size | Order |
| --- | --- | --- |
| 18 days | 1 track | 1st |
| 17 days | 500 tracks | 2nd |
| 16 days | 1000 tracks | 3rd |
| 16 days | 12 tracks | 4th |

Proliferation of Complexities Due to Backup Criteria.

Because MGMTCLAS also contains all the criteria for backup policy (i.e. how often to backup changed files, how many backup versions to keep, etc.), there is a tendency for changes in migration policy and changes in backup policy to complicate each other. That is, to create a distinction in migration policy requires a new "row" in the MGMTCLAS table; to create a distinction in backup policy also requires a new row. Complex distinctions can require many combinations.

Impact of Organization Changes.

It has been shown above that there are certain inherent difficulties in coming up with anything but a simplistic and arbitrary scheme for migration policy. The problems are magnified when one considers the dynamic aspect of the storage management domain. That is, most organizations with DASD farms to manage encounter several or most of the following events:

new applications and users are added to the system;

existing applications change;

continuous technology changes need evaluation;

staffing changes within the organization; and organizations merge with other entities.

Thus, even if one allows that a MGMTCLAS table of policies has been defined and an ACS routine written to assign policies in a manner that is acceptable in the short run, the dynamics of change will work toward undermining these schemes.

The foregoing difficulties illustrate the challenge of managing DASD resources. Keeping track of all those intersecting rules and the corresponding assignments can be very complicated in a large, dynamic, DASD installation. Because of the complexities, there is a tendency to resist making distinctions in policies to keep things simple to manage. Thus, there is a need for a product which can manage hundreds of thousands of heterogenous files from many different applications in an intelligent, cost-effective, user-friendly, manner.

SUMMARY OF THE INVENTION

The present invention is directed to a pattern based space management apparatus and method for a computer system having at least two levels of hierarchical storage. The apparatus is comprised of computer code for creating and maintaining a data base containing size information and historical information about the use of data sets residing on the computer system. Code is provided for calculating a next reference date for certain of the data sets and a confidence level for each of the next reference dates from information in the data base. An input device may be used to define an amount of the highest level storage space which is to remain available. Code is provided for identifying which data sets should be migrated between the storage levels of the computer system based on the next reference dates, the confidence levels, the sizes of the data sets, and the amount of highest level storage space which is to remain available. Code is also provided to effect the migration of the data sets identified for migration.

In a preferred embodiment of the invention, when insufficient historical information is available, next reference dates are determined based on an examination of files having similar name patterns. If no name pattern information is available, next reference dates are calculated based on age information.

In a preferred embodiment of the invention, the migration of files is not only from high level storage to low level storage, but is also proactive in the sense of migrating files from low level storage to high level storage just before the next reference date is reached.

In a preferred embodiment of the invention, data sets which are migrated to tape are grouped together according to their next reference dates so that the number of tape mounts may be reduced.

The present invention is also directed to a method of pattern based space management for use on a computer system having at least two levels of hierarchical storage. The method is comprised of the steps of:

creating and maintaining a data base containing size information and historical information about the use of data sets residing on the computer system;

calculating a next reference date for certain of the data sets and a confidence level for each of the next reference dates from information in the data base;

defining an amount of the highest level storage space which is to remain available;

identifying which data sets should be migrated between the storage levels of the computer system based on the next reference dates, the confidence levels, the sizes of the data sets, and the amount of highest level storage space which is to remain available; and migrating the identified data sets.

The method and apparatus of the present invention provide a logical basis for migrating files based on historical information. Because the invention learns about the computer system as time goes on, the need for fine tuning of parameters and continuously changing parameters based on changes in the computer system is eliminated. The invention works transparently to the user and eliminates thrashing. Files may be migrated proactively to minimize access time and user frustration. Those and other advantages and benefits of the present invention will be apparent from the Description of a Preferred Embodiment hereinbelow.

BRIEF DESCRIPTION OF THE DRAWINGS

For the present invention to be clearly understood and readily practiced, the present invention will be described in conjunction with the following figures wherein.

DESCRIPTION OF A PREFERRED EMBODIMENT

Figure 1:
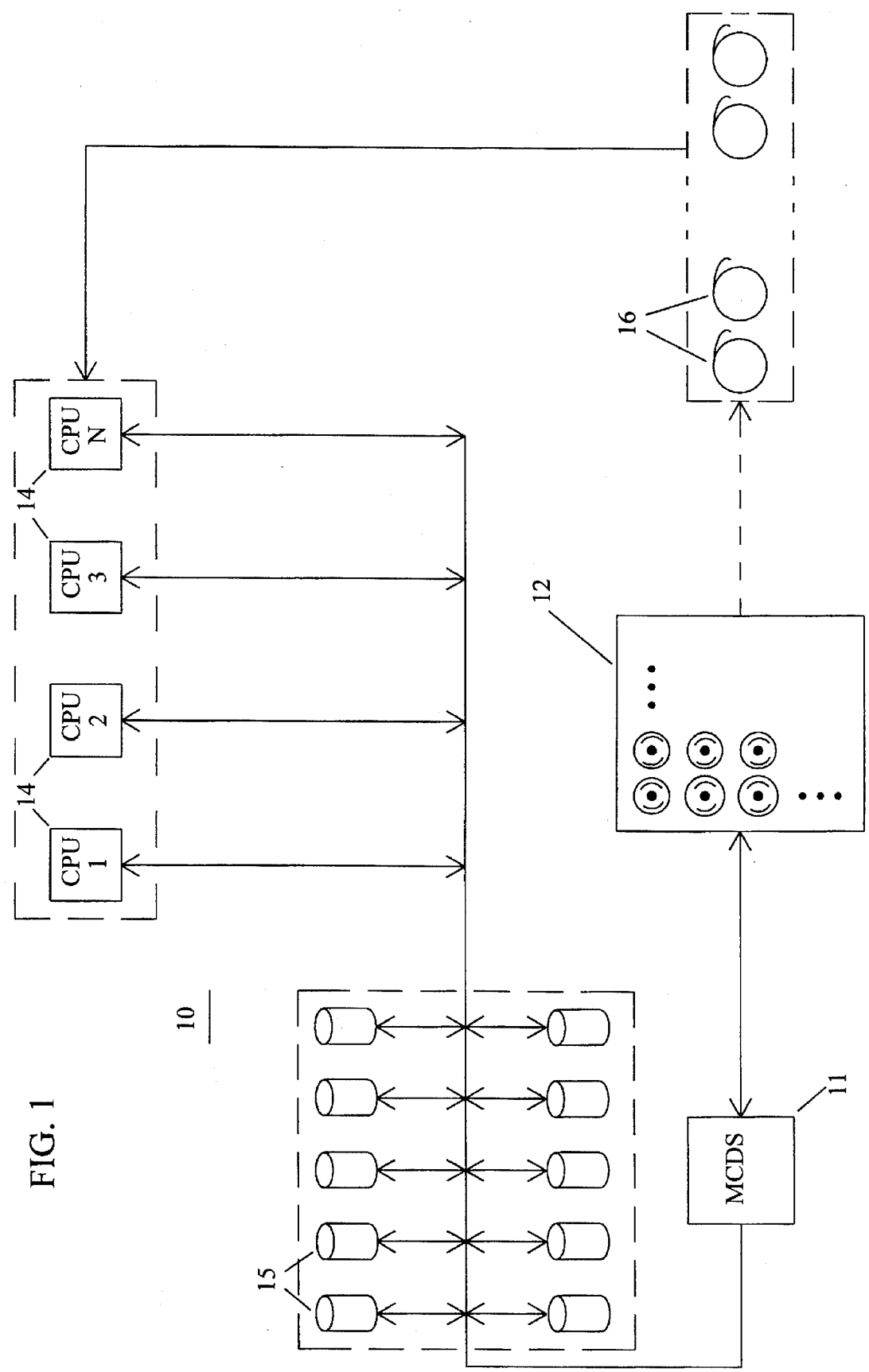
FIG. 1 illustrates one type of computer architecture with which the present invention may be implemented.

The present space management system may be implemented on many different computer systems or architectures, one of which is illustrated generically in FIG. 1 for purposes of illustration and not limitation. In FIG. 1, the computer architecture 10 is comprised of a large number of shared direct access storage devices (DASD's) 15 connected to a plurality of computing systems shown as central processing units (CPU's) 14. A plurality of tape drives 16 is provided so that information may be input into the system in a known manner. The architecture 10 also includes a storage device 11 containing a migration and control data set (MCDS) which contains information about the data sets migrated to an offline tape library 12 (storage level ML2) as well as information about data sets migrated to storage level ML1. Tapes may be recalled from library 12 for mounting on tape drives 16.

Figure 2:
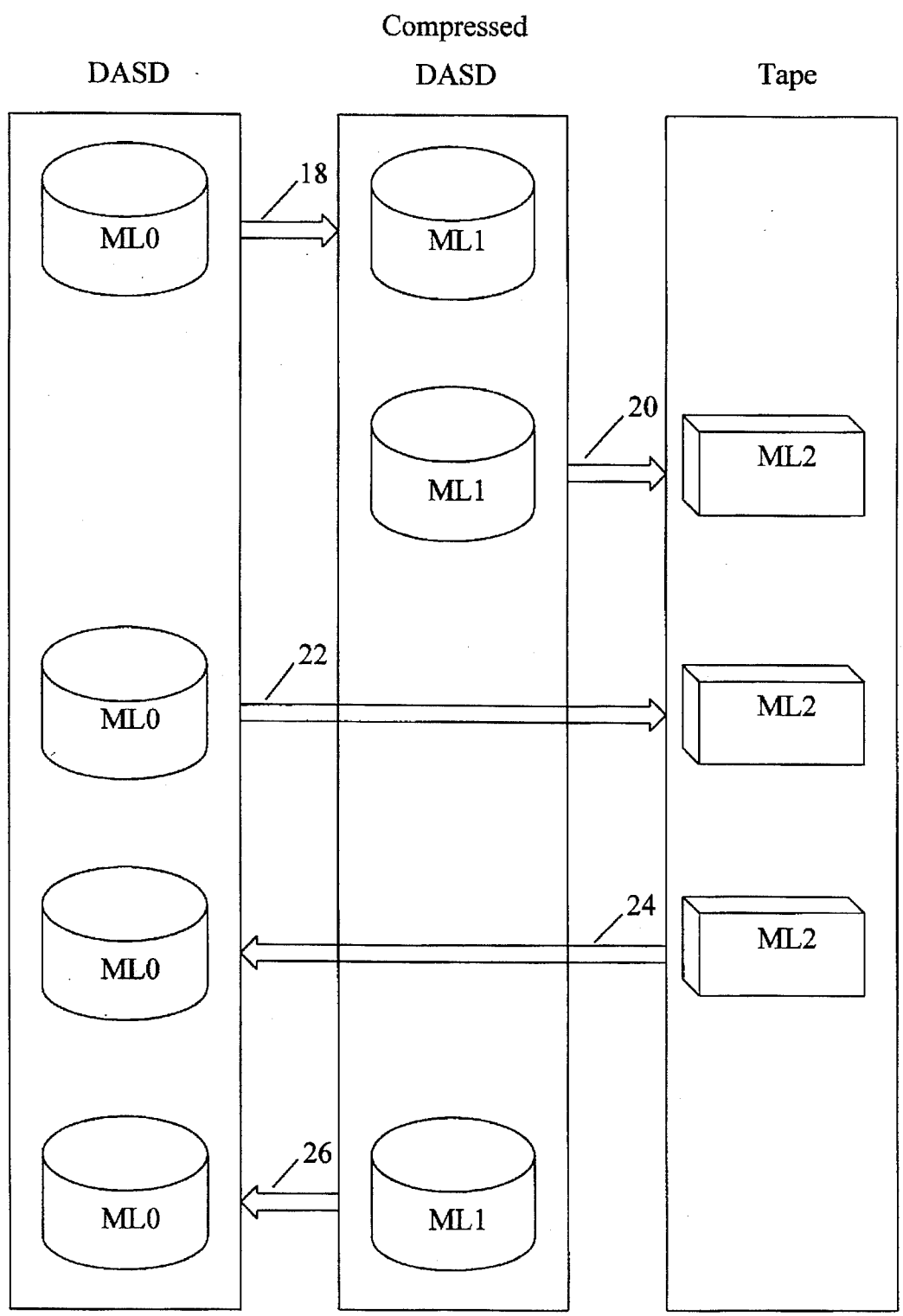
FIG. 2 illustrates three different levels of archival storage.

The hierarchy of storage in the architecture illustrated in FIG. 1 is illustrated in FIG. 2 wherein three different levels of archival storage are illustrated. Two of the levels, ML0 and ML1 reside on the DASD's 15 while the level ML2 is implemented through the library 12. FIG. 2 also illustrates how data may migrate:

from ML0 to ML1 as shown by arrow 18;
from ML1 to ML2 as shown by arrow 20;
from ML0 to ML2 as shown by arrow 22;
from ML2 to ML0 as shown by arrow 24; and
from ML1 to ML0 as shown by arrow 26.

The initial implementation of the present invention was carried out in the following environment:

MVS: MVS/XA or MVS/ESA Operating System (from IBM);

HSM: DFSMShsm or DFHSM 2.6 Hierarchical Storage Management Product (from IBM); and Hardware platforms: Architectures supporting System/370 System/390, and ES/9000 (from IBM or equivalent PCM vendors).

It should be emphasized that while there are many "infrastructure" components of the present invention that are dependent on the aforementioned implementation, the principles underlying the present invention, particularly those related to the prediction of future reference dates of files, are applicable (and portable) to other platforms. The only requirement of any other platform is that the operating system or file system of that platform maintain a "meta-file" or directory for all files in the system and that this meta-file include the size and date of last reference for a given file. Thus, while we have chosen to describe the operation of the present invention and its rules and algorithms with liberal references to MVS and HSM platform specific terminology, the reader will understand that the underlying principles could be implemented on another platforms.

Figure 3:
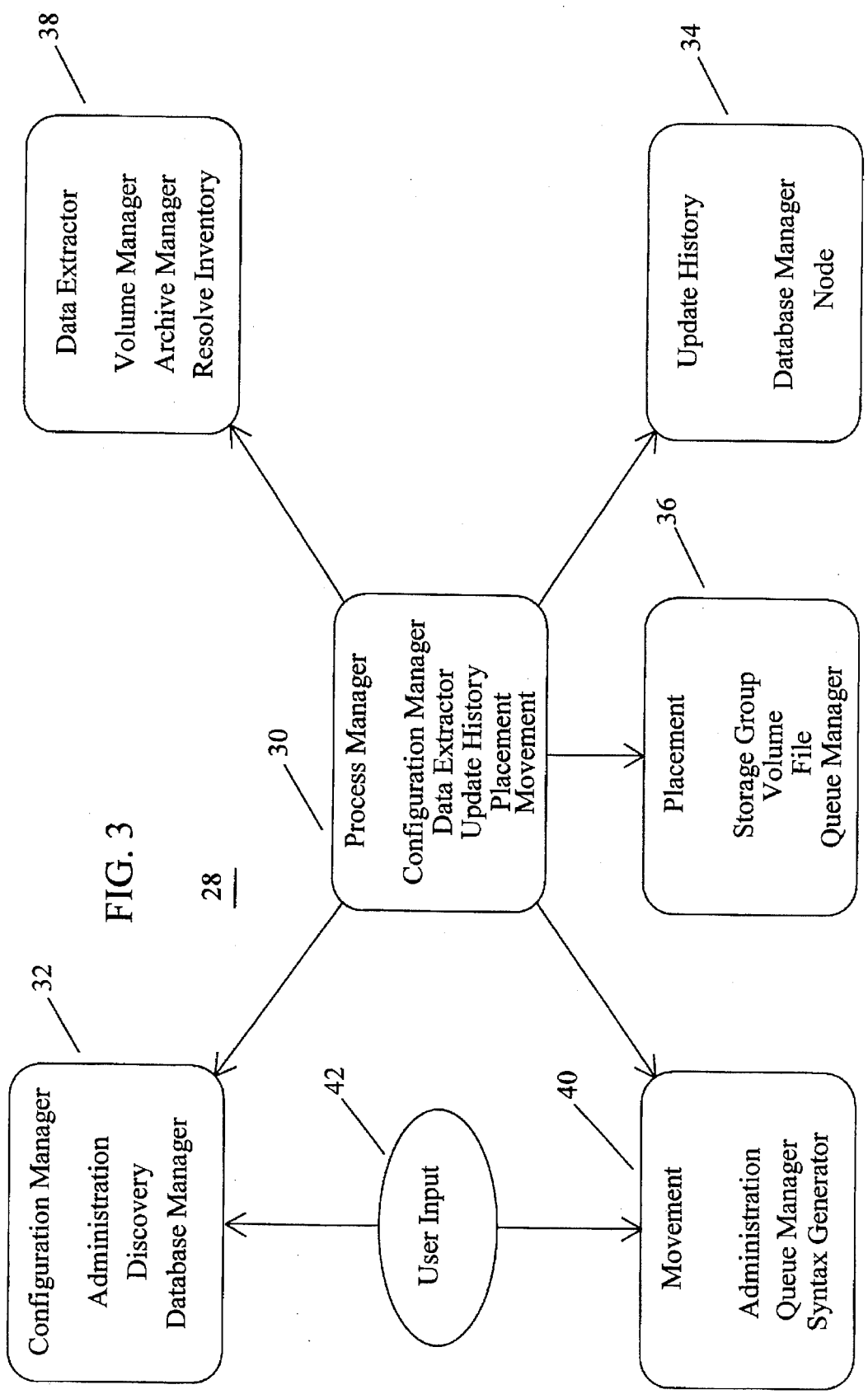
FIG. 3 is a block diagram illustrating the functional modules which comprise the space management system of the present invention.

FIG. 3 is a block diagram illustrating the functional modules which comprise the space management system 28 of the present invention. The reader will understand that the software implementing the modules illustrated in FIG. 3 resides on a DASD 15 and is implemented by a CPU 14 of FIG. 1.

Returning to FIG. 3, the middle box shows the role of a process manager or control module 30. Its function is to control the processes in the other modules and to detect any errors at a lower level. There is virtually no inter-module communication with one exception. A configuration manager 32 (also referred to as an ADMIN object) is a container for many housekeeping functions that are called by all modules. Other than that, each module is relatively self contained.

The following sections present brief overviews of the function and purpose of each module. Following those sections is an operational description of the present invention, and following the operational description, are several tables which describe the logic and rules utilized in the modules. Many of the functions that are merely "housekeeping" in nature are briefly described without elaboration as it will be readily apparent to one skilled in the art how to implement such housekeeping functions. It is believed that the unique aspects of the present invention are particularly concentrated in an update history module 34 and a placement module 36. The other modules provide the supporting "infrastructure" for the operation of those two modules.

Process Manager Module 30

This is the control module for the entire product. It calls all major functional modules to perform their special role and checks the return codes to determine if processing should continue or if error messages need to be issued and processing suspended. In the classic programming sense, this is the main routine and it invokes all others. As a part of initialization, the configuration manager module 32 is invoked. Module 32 performs numerous obviously necessary initialization functions but is not discussed here in any detail because it is not the focus of the present invention, and such initialization details will be apparent to one of ordinary skill in the art based on the specific code written to implement the present invention.

Data Extractor Module 38

This module collects a massive amount of raw data from the computer system on a daily basis. We refer to this collection of raw data as an "inventory" because it is a very good analogy of the kind of snapshot-style inspection of the shared DASD resources and MCDS that is performed. The requirements for this collection process are that it be extremely fast and efficient because the longer it takes to perform a "snapshot", the more the snapshot tends to become like a "movie" and inaccuracies creep in to the measurements.

Raw data collection is immediately followed by a transformation process we call the post processor. Here this massive amount of raw data is sorted and trimmed down to only essential data elements and disparate data items are normalized into flat records that are easier to work with in the next phase of the process.

Update History Module 34

This is one of the modules that we believe encompasses several important features of the present invention. The purpose of this module is to build and maintain a comprehensive, period-to-date, data base of all data sets (files) in the DASD farm. Content of the data base is of two broad forms:

data set access patterns on a period to date basis;

various statistics used for reporting.

Granularity of the data base is managed with full details kept for each data set or file, summarized up into a record for each volume, summarized up into a record for each storage group, summarized up into a single record for the whole DASD farm or complex.

With a period-to-date data base being refreshed in its entirety every day through a merge of a freshly taken inventory and the existing data base, something must be done with the current data base which is about to be obsoleted by the merge process. That aging process trims the data base down to contain only records having actual movement events associated with them along with any records for which the management system 28 made a recommendation for movement. Thus, there is always a large current interval representing this latest construction of the period-to-date data as well as some number of previous intervals trimmed as just described. The data wraps when the space is used up and the oldest previous intervals are discarded. Statistics at the volume, storage group, and complex levels of summarization are kept in a different physical segment of the logical data base and the number of instances is smaller which will keep the wrap frequency to a minimum allowing for a long term look at the overall functioning of the management system 28.

In the update history module 34, prediction of future access is made for each data set under consideration. There are three logical methods, based on historical statistics, name patterns, and age information, used in that process which are described in detail in the tables that follow hereinbelow. The distinctions between the update history module 34 of the management system 28 and traditional HSM decision-making are robust. HSM has no knowledge of any access pattern of any data set and relies only on parameters which enable the concept of eligibility. The update history module 34 uses the cumulative, period-to-date data base to develop a next expected reference date (NRD). The projection of the NRD is made as a byproduct of the overall operation of the module and is used in the next logical step which is carried out in placement module 36.

Placement Module 36

Immediate transition is made to the placement module 36 sometimes referred to as the placement optimizer. Here the objective is to achieve the target thresholds (allocated space as a percentage of capacity) for all volumes within all storage groups. Candidates for movement (migration and recall) are formed and evaluated. In this process, a savings index is calculated for each data set. The savings index is a measure of how valuable it will be to migrate the data set.

First, the next reference date (NRD) is converted into an integer representing the number of (future) days from now (date of evaluation) until the NRD. That number is called the IDA (idle days until [expected] access). The IDA value is multiplied by the size of the data set in kilobytes to form the savings index.

Thus, space management system 28 operates on a "sliding scale" in the sense that larger data sets will tend to be allowed shorter periods of inactivity or idleness before being selected for migration than smaller. Because the relative contribution to free space is so small by migration of smaller data sets and the risk of recall is equally great, the space management system's 28 rules will result in smaller data sets being allowed longer periods of idleness than those that are larger. All of that happens automatically on a smoothed, sliding scale due to the internal sorting in descending sequence on the savings index.

The final output of the placement module 36 is the creation of a temporary set of objects or requests stored in the data base. Those represent data sets that are to be moved in the hierarchy by the next module.

Movement Module 40

This module is a driver to the HSM interface. It selects requests from the data base that are to be moved and calls HSM through a standard API to that system. The bulk of the processing deals with serialization and queue management, the details of which will be apparent to one of ordinary skill in the art.

User Interface 42

In normal operation, the management system 28 operates transparently to the user. However, the user may wish to monitor the operation of the management system 28. Accordingly, a commercially available browsing facility may be provided which is accessed through user input 42. Such a facility allows the user to browse through data to gain confidence that the management system 28 is operating properly. If the management system 28 is implemented in a way that the movement module 40 may be inhibited so that the management system 28 only provides recommendations with respect to the migration of files, user input 42 may be used to access that mode of operation. User input 42 may also be used to input housekeeping information, for example, the proper prefix to be used for data sets, the name of MCDS, and the like, or to change default settings such as the amount of ML0 storage that should remain free. The reader will understand that the particular uses for user input 42 will depend upon the manner in which the management system 28 is implemented in code.

Operational Description

The management system 28 of the present invention does not attempt to replace existing archiving software, it works with that software to make better decisions and solve the various problems described above. Those problems will now be addressed again, but in terms of how the present invention solves them.

Bad decisions are based on rules that are too simplistic.

The management system 28 avoids simple rules ("move a file after 14 days of inactivity") and makes decisions based on the actual access patterns of the files on the computer system. It keeps that knowledge in a data base that is updated each day. That data base is used each day to calculate three important elements for every file on the computer system:

The Next Reference Date (NRD) is a prediction, based on past history or probabilities, of the next date that a file will be accessed.

The Confidence Level (CL) is a percentage measure of how confident the management system 28 is that the calculated NRD is accurate. The management system 28 may be set up to not move a file unless that value, e.g. 90%, is met or exceeded.

The savings index (SI) is a measure of the benefit that would be gained by moving a particular file. It is calculated using both the NRD and the size of the file.

Each day the management system 28 checks the available storage space in each of the storage groups. If the available space falls below a user-specified threshold, the management system 28 will determine the best candidates for movement, using the elements explained above. Files with the highest SI values will be moved off until the desired threshold of available space is realized. Each file will be moved either to compressed storage or offline storage, based on its size and projected activity. Also, each file stored in compressed storage will go through a rejustification process to determine whether it should stay there or be moved to offline storage.

Using past access patterns from the data base to predict future file access is known as the history method. For files too new to have a history, the management system 28 attempts to predict access based on the name of the file. For example, if all file names with the word "PAYROLL" in them are accessed on the 1st and 15th days of each month, then new files that appear with the same name pattern will probably also have the same access pattern. When that happens, the management system 28 uses the name method to let those new files inherit the patterns of their "brothers." For files with no history and no name matching, the management system 28 uses the age method to predict access based on the access probability of other files with the same age and in the same storage area.

The use of the methods described above not only results in fewer bad movement decisions, but also allows early movement of data based on its history. Consider an example of a data set moved off after 28 days due to HSM eligibility and actions, only to be needed a few days later. A reference to such a data set would trigger a demand recall of the data set. In contrast, the space management system 28 recognizes that pattern and will able to move the file the day after it was used, thus saving 26–27 days of occupancy on primary storage. That type of early movement is known as a proactive migration.

Too much time is spent waiting for data to be moved back to Primary storage.

As already noted, archive products move data off primary storage, but only bring it back when requested by the user, either when trying to access the file or through user-issued commands. That either causes the user to wait for his data, or makes him plan ahead so he can remember to issue the commands.

The management system 28 solves that problem through smarter movement of data (as explained above), and also through a process known as predictive recall. Because the management system 28 knows the history of each file, it may know when each file will next be used. So while archive products will never move data back to primary storage automatically, the management system 28 of the present invention will have it back in place just before it's needed.

To minimize the number of tapes that must be mounted to retrieve offline files, the management system 28 stacks files on the tapes in the order they are expected to be needed. That file stacking means fewer tapes need be mounted. The tape mounting can also be scheduled for quiet periods, when the computer operators have less to do, and the load on the computer system will be less. That off-peak recall of data reduces demands on the computer system.

Archive systems require too much tuning and monitoring.

While an archive system can be a great help if it is working correctly, it can cause disastrous results if it is operating with incorrect options. Those options take a lot of time to fine tune while installing the archive system, and they must constantly be adjusted to keep the software operating efficiently.

The space management system 28 uses a minimum of options to guide its operations. Many of the options it needs can be extracted from the archive system, or from other components of the computer system. Because the management system 28 is a heuristic system, it will learn about changes to the environment, rather than having to be informed through an option. Thus, it will take less time to maintain and will be less subject to errors caused by incorrect options.

Logic and Rules

In the tables that follow, we have transcribed the code into a sequential narrative of the module's function. The row numbers are for readability and cross-referencing. Once again, there is virtually no inter-module communication so inter-module diagrams are not relevant. Intra-module communication is indicated in the form of references to other subordinate tables.

TABLE A-1

Process Manager

| Row | Action/Rule | Glossary/Reference |
|---|---|---|
| 1 | Process Manager is ATTACHed as a subtask within an MVS address space set up as a started | |

TABLE A-1-continued

Process Manager

| Row | Action/Rule | Glossary/Reference |
|---|---|---|
|  | task intended to remain active for the life of the IPL. | |
| 2 | Invoke the Configuration Manager to perform all initialization functions. | This includes many housekeeping functions; a partial list is included here to provide an overview: obtaining common storage establishing an error exit parsing of MMC control parms parsing HSM parameters establishing hook for HSM event collection (ie. FSR record intercept) |
| 3 | WAIT until a user specified time-of-day | One of the MMC control parms designates when the MMC "daily processing cycle" is to begin. |
| 4 | (At the proper time-of-day or upon command) Invoke the Data Extractor Module | Data Extraction is composed of two broad phases: An Inventory phase which collects raw data about all data sets in the DASD farm including those that have been archived. A Post-Processor phase which "normalizes" all this raw data into more manageable records suitable for the next module. |
| 5 | Invoke the Update History Module | Transition to Update History is immediate assuming no errors from the Data Extractor. See Table U-1 for details. |
| 6 | Invoke the Placement Module | Transition is immediate assuming no errors from Update History. See Table P-1 for details. |
| 7 | Invoke the Movement Module | Transistion is immediate assuming no errors from Placement. |
| 8 | WAIT until next Data Extractor time arrives; Terminate the address space when requested by STOP command. | Usually each daily processing cycle is an "interval" of exactly 24 hours. |

TABLE X-1

Data Extractor

| Row | Action/Rule | Glossary/Reference |
|---|---|---|
| 1 | Initiate Storage Inventory phase | |
| 2 | Discover all online DASD volumes that are not to be excluded and prepare to ATTACH asynchronous subtasks for taking an inventory of the files in the DASD "farm". | Other housekeeping functions like dynamic allocation of all needed data sets are also performed. |
| 3 | Attach a single subtask to collect SMS information about storage groups and management classes. | STORGROUP data is vital to all other aspects of the product; MGMTCLAS data is primarily needed to contrast MMC recommendations and actions with what would have happened with HSM/MGMTCLAS rules. |
| 4 | Attach a single subtask to scan the HSM Migration Control Data Set (MCDS) | The MCDS is a database maintained by HSM which has information on all migrated data sets (everything not on primary storage). |
| 5 | Attach 16 subtasks to scan VTOCs | The VTOC is a volume table of contents (i.e. a meta-file showing what files exist on a |

TABLE X-1-continued

Data Extractor

| Row | Action/Rule | Glossary/Reference |
|---|---|---|
| | | primary storage volume and their attributes). |
| 6 | Attach 10 subtasks to scan VVDS structures | The VVDS is like an auxiliary VTOC providing other attributes of data sets on a given volume (eg. the MGMTCLAS of a data set). |
| 7 | Accept requests to write output records (and messages) from all the subtasks. | Handles the I/O of the raw data output records. |
| 8 | Normalize all VTOC data into flat records | The raw data is not suitable for further processing into a data base and must be "cleaned-up" or "normalized". |
| 9 | Normalize all VVDS, MCDS, and SMS data into flat records | |
| 10 | Sort and Merge VTOC and VVDS data by filename (DSNAME) | Required because vital VVDS information must be appended to the VTOC information for a data set |
| 11 | Output 1 record per data set in the DASD inventory | |
| 12 | Output 1 record per data set in the MCDS | Migrate records only; from both ML1 and ML2. |
| 13 | Terminate and return to Process Manager | ontrol reports written to JOURNAL. |

TABLE U-1

Update History Module

| Row | Rule/Attribute | Glossary/Reference |
|---|---|---|
| 1 | Communicate with the FM Intercept Routine to request that it write all the FSR records it has captured since the previous inventory to a temporary file. | The Intercept Routine is a function of the Migration Manager that captures FSR (Function Statistics Records) data written by the data mover (HSM). |
| 2 | Sort and reformat the FSR records, and prepare them to be merged with the data base. | |
| 3 | Unload the most current data base interval to produce a temporary file of all the data sets for which the Migration Manager has observed history. | Multiple intervals exist in the data base, and each interval represents one day's processing by the Migration Manager. |
| 4 | Merge three input files together to create one temporary file that represents the data base updated with today's inventory. The three files to be merged are: The FSR activity file (see Rows 1-2) The unloaded data base (see Row 3) Today's storage inventory | |
| 5 | During the merge, when the inventory reflects that a data set has completed an access cycle, update the cycle table for that data set. | An access cycle is a period of activity, followed by a period of inactivity, followed by activity again. The entry that represents each data set in the data base contains a cycle table that describes up to 5 different access cycles. See Table U-2 for a description of how the cycle table is updated. |
| 6 | During the merge, use the observed history for each data set to calculate a next reference date and a confidence level. These will become the basis for today's predictions about each data set. | The next reference date is the Migration Manager's prediction of the next date the data set will be referenced. The confidence level is a percentage that reflects the confidence that the next reference date is accurate. Migration Manager will never move a data set unless this value is 90% or greater. |

TABLE U-1-continued

Update History Module

| Row | Rule/Attribute | Glossary/Reference |
|---|---|---|
| | | See Table U-3 for a description of these calculations. |
| 7 | During the merge, invoke the Node Manager for each data set. The Node Manager uses tables created yesterday to predict the next access to this data set based on its name and/or its age. Today's data will also be used to create tables that will be used tomorrow. | See Table U4 for a description of the Node Manager. |
| 9 | During the merge, if the prediction done by the Node Manager is more accurate than the prediction described in Row 6, use the next reference date and confidence level calculated by the Node Manager. | The prediction is considered to be more accurate if the confidence level from the Node Manager is greater than the confidence level from Row 6. |
| 9 | During the merge, test for migrated data sets that are about to be used and need to be recalled to primary storage. | See Table U-5 for the rules that control Recall Processing. |
| 10 | When the merge is complete, close and sort the temporary file from the merge, and prepare to rebuild the data base. | |
| 11 | Delete all the data set information residing in the current interval of the data base. Then rebuild data set entries for only those data sets that had activity since the last inventory. | Activist means an FSR event for the data set, or a Migration Manager recommendation during the previous cycle. |
| 12 | Create a new data base interval, and populate it with the information from the temporary file created by the merge. | |
| 13 | Delete the existing Node Manager tables from the data base, and replace them with the tables from today's processing. These tables will then be used for the next cycle. | The Node Manager uses Name tables that predict access based on data set name, and Age tables that predict access based on the days since the last usage. |
| 14 | Print statistics in the message journal from today's processing. | |
| 15 | Return to the Process Manager. | |

TABLE U-2

Maintenance of Access-Cycle Tables at the Data Set Level

| Row | Rule/Attribute | Glossary/Reference |
|---|---|---|
| 1 | If a new access cycle did not occur since the last inventory, no cycle table maintenance is needed and we can immediately return (exit from this table). For example, all data sets whose last reference date has not changed are still in their "inactive period". Only when this cycle in progress is terminated by the next reference to this data set will we have the active day that causes a new access cycle to be formed. | An access cycle consists of: One or more active days One or more idle days An active day When the second period of activity starts, the previous access cycle ends. |
| 2 | In the data base entry for this data set, increment the total cycle count by one. | Total cycle count reflects the total number of access cycles observed over the life of the data set. |
| 3 | Calculate the number of active days and idle days for the access cycle just completed. | |
| 4 | Examine the cycle table for this data set, looking for active days and idle days values that match those just calculated (in row 3 above). | Each cycle table may contain up to 5 different cycle table entries. |
| 5 | If a match was found, this indicates the current access cycle matches a previously observed access cycle for the same data set. Increment the weighted count portion of the cycle table entry by the total cycle count. | The weighted count is used to determine which of the access cycles is most likely to occur again. Because it is derived from total cycle count (which increases with each cycle), cycles with high weighted counts are most likely to repeat. The weighted count enables a trend to be seen from multiple cycles in that the most recently observed cycle will have the |

TABLE U-2-continued

Maintenance of Access-Cycle Tables at the Data Set Level

| Row | Rule/Attribute | Glossary/Reference |
|---|---|---|
| | | highest weighted count. |
| 6 | If a match did not occur and unused cycle table entries exist, save the active days, and idle days values in the next available cycle table entry. Set the weighted count for the entry from the value of the total cycle count. | |
| 7 | If a match did not occur and all the cycle table entries are in use, replace the entry with the lowest weighted count with the new active days, idle days, and total cycle count values. | |
| 8 | If a cycle table entry was added or replaced (Row 6 or 7), resort all the cycle table entries in descending order based on idle days. | |

TABLE U-3

Calculation of the Confidence Level and Next Reference Date

| Row | Rule/Attribute | Glossary/Reference |
|---|---|---|
| 1 | If the total cycle count for this data set is less than 3, there is not enough history to predict the next access for this data set. | Set confidence level to 0%, and rely on the Node Manager to predict access. |
| 2 | Calculate the total weighted count by adding the weighted count values from all the used cycle table entries. In the example shown below, the total weighted count would be 10.<br><br>active days  idle days  weighted count<br>1  6  4<br>2  5  2<br>3  4  3<br>4  3  1 | Cycle tables are always maintained in descending sequence on the Idle Days attribute. In the scanning that follows in rows 3 and 4, this ordering causes the MMC rule to operate in a cautious or conservative predictive manner for projecting NRD. |
| 3 | Scan cycle table entries from the "top" of the cycle table until the sum of the weighted counts is 90% or greater when compared to the total weighted count calculated in Row 2. | In the example in Row 2, the first 3 cycles would be selected because 4 + 2 + 3 is 90% of 10. |
| 4 | Scan towards the "top" of the cycle table until an entry is found where the idle days value meets or exceeds the idle days value of the current cycle. | Assuming the current idle days is 6, in the example in Row 2 the first cycle table entry would be selected. |
| 5 | If the condition in Row 4 was never met, the data set has entered a longer inactive period than we have ever observed before. We cannot predict access for this data set. | Set confidence level to 0% and set the NRD to TODAY. Rely on the Node Manager to predict access. |
| 6 | If the data set was accessed since yesterday, it is still in the active portion of its access cycle, and we should not move it. | Set confidence level to 0% and set the NRD to TODAY. |
| 7 | If the total cycle count is less than 10, reduce the confidence level by 2% for every cycle less than 10. This will reduce confidence for data sets where we have not observed a lot of history. | Example: A data set has 100% confidence but has only 7 access cycles. The confidence level will be reduced by 6% to 94%. |
| 8 | Calculate the next reference date by adding the idle days value from the selected cycle table entry to the last reference date for the data set. Then add 1 to the result. | In the example in Row 2 the first cycle table entry was selected. The idle days value from that entry (6) will be added to the last reference date. |

TABLE U-4

Operation of the Node Manager

| Row | Rule/Attribute | Glossary/Reference |
|---|---|---|
| 1 | Search the data base to see if a name table exists with a prefix that matches the name for this data set. If a match is found, calculate the confidence | Example: A name table with a prefix of PAYROLL.* would match a data set with a name of |

TABLE U-4-continued

Operation of the Node Manager

| Row | Rule/Attribute | Glossary/Reference |
|-----|----------------|--------------------|
| | level and the next reference date using elements in the name table. The structure of the name table is described in Row 4. | PAYROLL.MARCH. |
| 2 | If no name table was found, search the data base to see if an age table exists for the storage group assigned to this data set. If an age table exists, calculate the confidence level and the next reference date using elements in the age table. The structure of the age table is described in Row 5. | The age table is searched for the next age where 90%+ of the data sets with that age will not be referenced. That age is added to the last reference date to calculate the next reference date. |
| 3 | If neither a name table nor an age table were found for this data set, the Node Manager cannot predict the next access. | Set the confidence level to 0% |
| 4 | Use information about this data set to build the name tables that will be used in the next processing cycle. For each data set prefix, maintain a count of the number of data sets found and the frequency of access to those data sets. After all the data sets with the same prefix have been seen by the Node Manager, determine if enough data was found to make an accurate prediction. If so, calculate the confidence level and the next reference date, build a name table, and write it to a temporary file for later copying to the data base. | The following tests are used to determine if the data present is accurate enough to predict future access:<br>1) At least 15 data sets must have been found with the same prefix.<br>2) At least 90% of the accesses to the data sets must have occurred within the same range of days (i.e. 1–5, 6–10, etc.)<br>See Exhibit E-1 for examples. |
| 5 | Use information about this data set to build the age tables that will be used in the next processing cycle. For each storage group, maintain a table of the number of data sets found, the age of each data set, and whether the data set was referenced since the last cycle. When all data sets have been seen by the Node Manager, this data can be used to create age tables for each storage group. These age tables will be created and written to a temporary file for later copying to the data base. | An example appears below:<br>age  number  referenced<br>9    100    8<br>This would indicate that 100 data sets were found that hadn't been used for 9 days, but 8 of them were used yesterday. So, data sets with this age have a 92% chance of not being referenced. These values are maintained as running totals, so they reflect access over the life of the data, and are not just based on one day.<br>See Exhibit E-2 for examples. |

TABLE U-5

Predictive Recall Rules

| Row | Rule/Attribute | Glossary/Reference |
|-----|----------------|--------------------|
| 1 | Evaluation of data sets is limited to those residing in ML1 and ML2. | |
| 2 | The calculated confidence level for the data set must be 90% or greater. | See Table U-1, Row 6. |
| 3 | The Migration Manager must have observed at least three complete access cycles for this data set. | See Table U-1. Row 5. |
| 4 | Examine each of the access cycles used to achieve the 90% confidence level. Within each of those cycles, the variance between the highest and lowest idle days values cannot exceed 5 days. | Here a compromise is being reached between observed idle days that are far apart from each other. It is a way of bringing greater reasonableness to the projection. |
| 5 | Examine each of the access cycles used to achieve the 90% confidence level At least 50% of those cycles must have idle day values less than or equal to the current observed idle days for this data set. | This is a further extension of the reasonableness checking discussed above. The objective is to discard the "outliers" from the set and select the most appropriate. |
| 6 | The access prediction for this data set must have been done based on its own history, and not set by the Node Manager. | This rule is rooted in our desire to be very conservative with predictive recall, not generating the data movement based on statistical-based derivations like the Name and Age Method but restricting these decisions to data sets with observed history at the data set level.<br>See Table U-1, Row 8. |
| 7 | Do not consider data sets excluded from Migration Manager control. | Users may request that certain data sets not be managed. |
| 8 | Do not consider data sets if multiple copies with | This would cause an error when trying to recall |

TABLE U-5-continued

Predictive Recall Rules

| Row | Rule/Attribute | Glossary/Reference |
|---|---|---|
| | the same name were found in the latest inventory. | the data set. |
| 9 | Do not consider the data set if the next reference date is after tomorrow. | Our rationale is that we do not want to pre-stage the data set back on primary storage too early and therefore waste space. Ideally, we would recall only minutes before needed but the measurements do not support that. See Table U-1. Row 6. |
| 10 | Do not consider the data set if the data mover (HSM) would move it off primary storage after less than 5 days of not being referenced. | Avoid conflicts with very aggressive data movement policies. |
| 11 | Do not consider the data set if the Migration Manager does not know the original location of the data set before it was moved off primary storage by the data mover (HSM). | While this is usually stored in the data base, it will not be present for data sets moved before the Migration Manager was installed. |
| 12 | When all criteria are met, data sets are moved based on a comparison of today's date with the NRD. | |

TABLE P-1

Placement Module

| Row | Rule/Attribute | Glossary/Reference |
|---|---|---|
| 1 | The data base is read to identify all the data sets selected for recall to primary storage by the Data Base Update module. If these data sets reside on storage groups that are managed, a recall request is built and written to a temporary file. This temporary file will later be the basis for all the movement requests passed to the data mover. | See Table U-1. Row 9. A storage group is a group of volumes with similar processing characteristics. The Migration Manager can be instructed to manage the storage group, in which case movement requests will be passed to the data mover rather than being just recommendations. |
| 2 | Each storage group will be evaluated to determine if space needs to be made available on the volumes belonging to the group. | See Table P-2 for a description of storage group processing. |
| 3 | Evaluation will occur for each data set residing on ML1 storage, plus each data set selected today for migration (See Row 2) to determine the optimum placement for each data set on either ML1 or ML2 storage. If the data set needs to be moved to achieve that placement, requests to perform that movement will be added to the temporary move file (See Row 1). | See Table P-4 for a description of ML1 optimization processing. ML1 is the first level of data manager offline storage, and usually resides on compressed DASD. ML2 is the second level and usually resides on compressed tape. |
| 4 | Statistics in the data base will be updated to reflect today's movement requests and recommendations. | |
| 5 | Statistics will be printed in the message journal for today's placement decisions. | |
| 6 | Return to the Process Manager. | |

Table P-2

Overview of Storage Group Placement Processing

| Row | Rule/Attribute | Glossary/Reference |
|---|---|---|
| 1 | Select the first volume assigned to this storage group, and determine the amount of space on the volume that needs to be freed to achieve the user-specified threshold percentage. If the current allocation amount is less than the threshold percentage, no space will need to be freed. | Example: A threshold percentage of 70% indicates that up to 70% of the volume may contain data, while 30% should be kept free. |
| 2 | Select each data set residing on the volume and determine if it is a candidate for migration. | See Table P-3 for a description of candidate processing. |
| 3 | For each candidate, calculate a savings index that | The savings index is calculated |

Table P-2-continued

Overview of Storage Group Placement Processing

| Row | Rule/Attribute | Glossary/Reference |
|---|---|---|
| | will reflect the relative value of moving this data set. Both the size and activity of the data set are considered in this calculation. | by multiplying data set size by the number of days until the next reference date. (IDA) |
| 4 | The process described by Rows 2-3 is repeated for all the data sets residing on the selected volume. | |
| 5 | If space needs to be freed on the volume to reach the threshold percentage, select the candidate data set with the largest savings index and create a request to migrate that data set. Continue this process until enough space has been freed, or the list of candidate data sets has been exhausted. Candidates still remaining after sufficient space has been freed are kept for later processing. | |
| 6 | The process described by Rows 1-5 is repeated for each volume in the storage group. | |
| 7 | Apply the same threshold percentage to the entire storage group and determine if more space needs to be freed. If so, consider the andidate data sets that were not migrated at the volume level (see Row 5). Order these in descending sequence by the savings index, then generate requests for migration until enough space has been freed, or the list of candidates is exhausted. | Example: Assume the threshold percentage is 70%, but we can only reduce this to 75% for a particular volume. If we can move that 5% using other candidates on other volumes, an average of 70% can still be met across the storage group. |

TABLE P-3

Selection of Candidate Data Sets for Migration

| Row | Rule/Attribute | Glossary/Reference |
|---|---|---|
| 1 | The calculated confidence level for the data set must be 90% or greater. | See Table U-1, Row 6. |
| 2 | Do not consider data sets excluded from Migration Manager control. | Users may request that certain data sets not be managed |
| 3 | Do not consider data sets that the data mover cannot move, or this will just generate an error when the migration is attempted. | Example: Some types of empty data sets cannot be moved by the data manager. |
| 4 | Do not consider the data set if the next reference date is today or tomorrow. | |
| 5 | Do not consider the data set if the Migration Manager has recalled the data set within the past 5 days, and the data set has not been used since the recall. | |
| 6 | Do not consider the data set if the number of days since the last reference is less than a user-specified minimum value. | Users can specify that active data sets need to "cool off" for a few days before being moved. Note that this is an optional facility where we warn users that any values for this parameter (MINAGE=) greater than 2 can work to undermine the value of pro-active migration and are strongly discouraged. |

TABLE P-4

Summary of ML1 optimixation Processing

| Row | Rule/Attribute | Glossary/Reference |
|---|---|---|
| 1 | Consider all the data sets that have been selected for migration today, plus all of the data sets that currently reside on ML1 storage. Order these data sets in ascending order by the savings index. Also calculate the ML1 threshold, which is the maximum amount of space that can be allocated by ML1 data sets. | Similar to the storage group threshold percentage, the ML1 threshold is also calculated based on a user-specified maximum allocation percentage. These thresholds are a normal part of HSM and SMS administration and are automatically discovered by the Configuration Manager |

TABLE P-4-continued

Summary of ML1 optimixation Processing

| Row | Rule/Attribute | Glossary/Reference |
|---|---|---|
| | | (ADMIN) at MMC Initialization. |
| 2 | Select the data sets identified by Row 1, and determine whether they should reside on ML1 or ML2 storage. Direct data sets to ML1 until the ML1 threshold is reached, then route the remaining data sets to ML2. Generate migration requests for all data sets selected for migration today, plus all ML1 data sets that need to move to ML2. | Rationale for ML2 placement is as follows: To the degree that the ML1 threshold is not constrained (lots of space), all newly migrated data sets go to ML1 with existing ML1-resident data sets remaining there as well. When ML1 is constrained, the Savings Index value will be used to move the largest and the most inactive to ML2 keeping the smaller and more active data sets on the ML1 resource. |
| 3 | Any requests generated today will now be ordered by: storage group priority movement request by (migrate, recall) tape volume (recalls only) next reference date (migrates only) | Priority allows faster processing or critical storage groups. The other ordering rules are designed to reduce tape mounts and make sure adequate space is available during the movement process. |
| 4 | Write the movement requests generated by Row 3 to the data base. These will then be read by the movement processor and passed to the data mover. | |

TABLE M-1

Movement Queue Handler (MOVETASK) Movement Module

| Row | Action/Rule | Glossary/Reference |
|---|---|---|
| 1 | Perform normal initialization functions such as establishing recovery routines and allocating the Migration Manager data base. Also, determine if we are the host or a slave processor. | Slave processors accept move requests and pass them to the data manager. The host processor does this plus other control functions. |
| 2 | Schedule a timer request so we can "sleep" for a while. | The MOVETASK is always active. It waits, checks for work to do, then waits again. |
| 3 | Read the data base to see if there are any move requests to be processed. If not, go back to wait as described in Row 2. | |
| 4 | Issue a hardware reserve against the data base. This will make sure other copies of the MOVETASK running on other processors do not attempt to process move requests the same time we are processing them. | This primitive form of multi-tasking through distribution of "workload" to other HSM address spaces helps the net throughput of the daily MIGRATE and RECALL load generated by MMC. The total elapsed time to accomplish all MMC-generated actions is reduced by the distribution of work. |
| 5 | Select move requests from the data base that have not been selected previously. Keep obtaining new requests until we have a "batch" of requests, or we exhaust the requests waiting to be processed. A "batch" will never contain more than 100 requests. | In order to be in the same "batch", requests must: 1) be of the same type 2) refer to the same HSM volume (ML2 recalls) 3) have the same next reference date (migrations) |
| 6 | Pass each of the requests in the batch to the data mover for processing. Update the data base to indicate each request has been completed. | |
| 7 | If all move requests in the data base have been processed, print statistics to the JOURNAL file. If we are naming as the host, delete all the move requests from the data base. | |

TABLE M-1-continued

Movement Queue Handler (MOVETASK) Movement Module

| Row | Action/Rule | Glossary/Reference |
|---|---|---|
| 8 | Release the hardware reserve so that other processors can use the data base. | |
| 9 | Go back to wait as described in Row 2. | |

Exhibit E-1: Contents of a Node Manager Name Table
Name Object Listing from Last Interval: 11/29/94 18:00:10

| DSName Pattern | Total DSNs | Days: 1–5 | 6–10 | 11–20 | 21–40 | 41–80 | 80+ |
|---|---|---|---|---|---|---|---|
| BACKUP.VAULT.* | 345 | 6 | 0 | 15 | 27 | 34 | 263 |
| Min = 4 Max = 370 IDA = 24 Confidence = 92% | | 1% | 0% | 4% | 7% | 9% | 76% |
| BACKUP.VAULT.LISTX6.* | 52 | 1 | 0 | 2 | 5 | 5 | 39 |
| Min = 4 Max = 340 IDA = 24 Confidence = 92% | | 1% | 0% | 3% | 9% | 9% | 75% |
| BACKUP.VAULT.LIST1.* | 51 | 1 | 0 | 2 | 5 | 5 | 38 |
| Min = 4 Max = 310 IDA = 24 Confidence = 94% | | 1% | 0% | 3% | 9% | 9% | 74% |
| BACKUP.VAULT.LIST2.* | 51 | 0 | 0 | 2 | 5 | 5 | 39 |
| Min = 11 Max = 310 IDA = 32 Confidence = 90% | | 0% | 0% | 3% | 9% | 9% | 76% |
| BACKUP.VAULT.LIST3.* | 53 | 2 | 0 | 4 | 5 | 9 | 33 |
| Min = 4 Max = 250 IDA = 18 Confidence = 90% | | 3% | 0% | 7% | 9% | 16% | 62% |
| BACKUP.VAULT.LIST4.* | 48 | 0 | 0 | 1 | 5 | 5 | 37 |
| Min = 18 Max = 340 IDA = 32 Confidence = 91% | | 0% | 0% | 2% | 10% | 10% | 77% |
| BACKUP.VAULT.LIST5.* | 45 | 1 | 0 | 2 | 2 | 2 | 38 |
| Min = 4 Max = 340 IDA = 24 Confidence = 91% | | 2% | 0% | 4% | 4% | 4% | 84% |
| BDISSEN.* | 55 | 4 | 0 | 5 | 0 | 5 | 41 |
| Min = 3 Max = 340 IDA = 13 Confidence = 92% | | 7% | 0% | 9% | 0% | 9% | 74% |
| BDISSEN.OV020200.* | 28 | 0 | 0 | 0 | 0 | 1 | 27 |
| Min = 49 Max = 340 IDA = 190 Confidence = 96% | | 0% | 0% | 0% | 0% | 3% | 96% |
| BDISSEN.OV020200.OPFX0475.* | 24 | 0 | 0 | 0 | 0 | 0 | 24 |
| Min = 190 Max = 280 IDA = 190 Confidence = 100% | | 0% | 0% | 0% | 0% | 0% | 100% |
| BST.* | 3037 | 359 | 159 | 260 | 319 | 311 | 1629 |
| Min = 1 Max = 370 IDA = 2 Confidence = 99% | | 11% | 5% | 8% | 10% | 10% | 53% |
| BST.BATCHEN2.* | 17 | 0 | 0 | 0 | 0 | 0 | 17 |
| Min = 139 Max = 310 IDA = 156 Confidence = 94% | | 0% | 0% | 0% | 0% | 0% | 100% |
| BST.CLPPROD.* | 15 | 1 | 0 | 9 | 1 | 2 | 2 |
| Min = 2 Max = 250 IDA = 19 Confidence = 93% | | 6% | 0% | 60% | 6% | 13% | 13% |

As an aid to understanding of the Node Manager Name Table, one of the entries shown in exhibit E-1 will be described. Refer to the second line shown on the exhibit. Note that this exhibit is a visual representation of an actual table and it has been formatted this way intentionally to promote understanding and debugging of the rules.

The prefix associated with the entry is BACKUP.VAULT.LISTX6. All data names beginning with that prefix can use this name table for prediction.

In the previous cycle, 52 data sets were found with this prefix. At least 15 data sets are required before a table will be created.

The distribution of access for those 52 data sets is as follows:
Used in the past 1–5 days: 1 (1%)
Used in the past 6–10 days: 0 (0%)
Used in the past 11–20 days: 2 (3%)
Used in the past 21–40 days: 5 (9%)
Used in the past 41–80 days: 5 (9%)
Used in the past 80+ days: 39 (75%)

The minimum age found for all the data sets was 4 days. The maximum age was 340 days.

These distribution tables will then be used to calculate an IDA (idle days until active) of 24 for the data sets in this group.

The confidence level associated with this value is 92% sets matching this name table will be assigned a next reference date that is 24 days after the last reference date. They will be assigned a confidence level for this date of 92%.

Exhibit E-2: Contents of a Node Manager Age Table

Age Prediction for Storage Group TSUGRP Last Interval: 11/29/94 18:00:10

| ID | REFPCT | DSNCNT | LAST | NET | NRD | ID | REFPCT | DSNCNT | LAST | NET | NRD | ID | REFPCT | DSNCNT | LAST | NET | NRD |
|---|---|---|---|---|---|---|---|---|---|---|---|---|---|---|---|---|---|
| 001 | 29.92 | 12137 | +003 | +002 | 12/02/94 | 052 | 6.77 | 3870 | +061 | +009 | 12/09/94 | 103 | 11.99 | 1151 | +113 | +010 | 12/10/94 |
| 002 | 57.80 | 732564 | +004 | +002 | 12/02/94 | 053 | 8.02 | 3008 | +062 | +009 | 12/09/94 | 104 | 6.33 | 1075 | +115 | +011 | 12/11/94 |
| 003 | 22.12 | 355571 | +007 | +004 | 12/04/94 | 054 | 9.43 | 2897 | +063 | +009 | 12/09/94 | 105 | 11.78 | 1172 | +115 | +010 | 12/10/94 |
| 004 | 29.08 | 281190 | +009 | +005 | 12/05/94 | 055 | 10.84 | 3259 | +064 | +009 | 12/09/94 | 106 | 6.64 | 1070 | +116 | +010 | 12/10/94 |
| 005 | 17.98 | 209505 | +015 | +010 | 12/10/94 | 056 | 8.70 | 3173 | +065 | +009 | 12/09/94 | 107 | 8.12 | 1084 | +117 | +010 | 12/10/94 |
| 006 | 14.86 | 178665 | +016 | +010 | 12/10/94 | 057 | 12.49 | 3244 | +066 | +009 | 12/09/94 | 108 | 6.34 | 1058 | +118 | +010 | 12/10/94 |
| 007 | 11.19 | 157464 | +016 | +009 | 12/09/94 | 058 | 10.34 | 3193 | +068 | +010 | 12/10/94 | 109 | 5.74 | 994 | +119 | +010 | 12/10/94 |
| 008 | 10.48 | 140419 | +016 | +008 | 12/08/94 | 059 | 8.78 | 2884 | +069 | +010 | 12/10/94 | 110 | 5.06 | 989 | +119 | +009 | 12/09/94 |
| 009 | 6.93 | 126279 | +017 | +008 | 12/08/94 | 060 | 9.21 | 2466 | +070 | +010 | 12/10/94 | 111 | 10.05 | 1045 | +120 | +009 | 12/09/94 |
| 010 | 4.51 | 115353 | +017 | +007 | 12/07/94 | 061 | 9.56 | 2815 | +071 | +010 | 12/10/94 | 112 | 9.39 | 1140 | +121 | +009 | 12/09/94 |
| 011 | 4.54 | 107588 | +017 | +006 | 12/06/94 | 062 | 8.68 | 2641 | +072 | +010 | 12/10 94 | 113 | 9.80 | 1174 | +121 | +008 | 12/08/94 |
| 012 | 4.95 | 95849 | +018 | +006 | 12/06/94 | 063 | 8.71 | 2653 | +074 | +011 | 12/11/94 | 114 | 8.86 | 1095 | +123 | +009 | 12/09/94 |
| 013 | 6.12 | 94065 | +018 | +005 | 12/05/94 | 064 | 10.69 | 3041 | +075 | +011 | 12/11/94 | 115 | 14.02 | 1049 | +125 | +010 | 12/10/94 |
| 014 | 5.10 | 89119 | +018 | +004 | 12/04/94 | 065 | 7.94 | 2922 | +077 | +012 | 12/12/94 | 116 | 6.79 | 958 | +127 | +011 | 12/11/94 |
| 015 | 5.78 | 85397 | 018 | +003 | 12/03/94 | 066 | 7.90 | 2953 | +078 | +012 | 12/12/94 | 117 | 9.17 | 884 | +128 | +010 | 12/10/94 |
| 016 | 42.76 | 19261 | +018 | +002 | 12/02/94 | 067 | 7.27 | 2710 | +080 | +013 | 12/13/94 | 118 | 6.92 | 829 | +128 | +010 | 12/10/94 |
| 017 | 23.39 | 12837 | +020 | +003 | 12/03/94 | 068 | 6.92 | 2790 | +082 | +014 | 12/14/94 | 119 | 11.46 | 934 | +129 | +010 | 12/10/94 |
| 018 | 24.06 | 11700 | +021 | +003 | 12/03/94 | 069 | 8.39 | 2828 | +083 | +014 | 12/14/94 | 120 | 12.79 | 978 | +132 | +012 | 12/12/94 |
| 019 | 30.23 | 12283 | +022 | +003 | 12/03/94 | 070 | 7.71 | 2998 | +084 | +014 | 12/14/94 | 121 | 11.09 | 893 | +134 | +013 | 12/13/94 |
| 020 | 24.50 | 10639 | +023 | +003 | 12/03/94 | 071 | 8.43 | 2919 | +085 | +014 | 12/14/94 | 122 | 4.38 | 914 | +135 | +013 | 12/13/94 |
| 021 | 25.20 | 9846 | +024 | +003 | 12/03/94 | 072 | 8.47 | 2114 | +086 | +014 | 12/14/94 | 123 | 5.43 | 940 | +135 | +012 | 12/12/94 |
| 022 | 29.15 | 9799 | +025 | +003 | 12/03/94 | 073 | 5.31 | 2298 | +088 | +015 | 12/15/94 | 124 | 6.29 | 939 | +136 | +012 | 12/12/94 |
| 023 | 24.73 | 8177 | +026 | +003 | 12/03/94 | 074 | 6.53 | 2237 | +089 | +015 | 12/15/94 | 125 | 4.20 | 954 | +137 | +012 | 12/12/94 |
| 024 | 23.07 | 7302 | +027 | +003 | 12/03/94 | 075 | 4.87 | 2119 | +090 | +015 | 12/15/94 | 126 | 7.78 | 952 | +138 | +012 | 12/12/94 |
| 025 | 22.33 | 6230 | +028 | +003 | 12/03/94 | 076 | 6.83 | 2579 | +091 | +015 | 12/15/94 | 127 | 9.19 | 969 | +139 | +012 | 12/12/94 |
| 026 | 20.74 | 5938 | +029 | +003 | 12/03/94 | 077 | 5.64 | 2520 | +092 | +015 | 12/15/94 | 128 | 11.54 | 962 | +141 | +013 | 12/13/94 |
| 027 | 25.80 | 5772 | +030 | +003 | 12/03/94 | 078 | 7.53 | 2603 | +092 | +014 | 12/14/94 | 129 | 8.22 | 925 | +142 | +013 | 12/13/94 |
| 028 | 30.45 | 5709 | +031 | +003 | 12/03/94 | 079 | 4.51 | 2444 | +093 | +014 | 12/14/94 | 130 | 4.84 | 827 | +144 | +014 | 12/14/94 |
| 029 | 29.50 | 5344 | +032 | +003 | 12/03/94 | 080 | 4.91 | 2425 | +093 | +013 | 12/13/94 | 131 | 3.96 | 834 | +145 | +014 | 12/14/94 |
| 030 | 28.74 | 5516 | +033 | +003 | 12/03/94 | 081 | 3.68 | 2338 | +094 | +013 | 12/13/94 | 132 | 5.30 | 887 | +146 | +014 | 12/14/94 |
| 031 | 22.07 | 4667 | +035 | +004 | 12/03/94 | 082 | 4.10 | 2271 | +094 | +012 | 12/12/94 | 133 | 7.36 | 884 | +147 | +014 | 12/14/94 |
| 032 | 19.84 | 4391 | +036 | +004 | 12/04/94 | 083 | 6.65 | 2349 | +095 | +012 | 12/12/94 | 134 | 11.46 | 925 | +148 | +014 | 12/14/94 |

As an aid to understanding the Node Manager Age Table, one of the entries sown in Exhibit E-2 will be described. Refer to the fourth line shown on the exhibit. Note that this exhibit is a visual representation of an actual table and it has been formatted this way intentionally to promote understanding and debugging of the rules.

The title indicates this table applies to all data sets in the storage group TSUGRP.

The fourth line has an ID value of 4, indication this row applies to data sets that have not been referenced for four days.

We have observed 281,190 of these data sets (column DSNCNT).

Of the observed data sets, 29.08% were referenced during the past processing cycle (column REFPCT).

To calculate the confidence level, it is necessary to scan forward in the table until the sum of the REFPCT columns is equal to or greater than 90%. In this case, we must add the REFPCT values for ID columns 4 through 9:

| ID | REFPCT |
|----|--------|
| 4  | 29.08  |
| 5  | 17.98  |
| 6  | 14.86  |
| 7  | 11.19  |
| 8  | 10.48  |
| 9  | 6.93   |
|    | 90.52% |

The LAST column for ID 4 contains a value of 009, indicating that it was necessary to use an ID of 9 before the 90% confidence level was reached.

The Net column for ID 4 contains a value of 005, the difference between the two ID values (9−4=5).

The NRD column shows what the next reference date would be for data sets of this age, based on today's processing date.

When a data set uses this age table and has been idle for 4 days, 9 days will be added to the last reference date, and the confidence level will be set to 91% (90.52 rounded).

What is claimed is:

1. A pattern based space management apparatus for a computer system having at least two levels of hierarchical storage, said apparatus comprising:

means for creating and maintaining a data base containing size information, name information, and historical information about the use of data sets residing on the computer system;

first means for calculating a first next reference date for certain of the data sets and a first confidence level for each of said first next reference dates from information in said data base;

second means for calculating a second next reference date for said certain of the data sets residing on the computer system and a second confidence level for each of said second next reference dates from the information in said data base including said name information;

means for defining an amount of the highest level storage space which is to remain available;

means for identifying, said means for identifying comparing said first and second confidence levels and selecting one of said first and second reference dates to be used based on which has the higher confidence level, said means identifying which data sets should be migrated between the storage levels of the computer system based on said selected next reference dates, the sizes of the data sets, and the amount of highest level storage space which is to remain available; and means for migrating the data sets identified by said means for identifying.

2. The apparatus of claim 1 wherein said data base includes age information about the data sets residing on the computer system, and wherein said second means for calculating calculates said second next reference date for said certain of the data sets residing on the computer system and said second confidence level for each of said second next reference dates from the information in said data base including said age information when there is no name information.

3. The apparatus of claim 1 wherein said means for identifying identifies files to be migrated from higher to lower levels of storage and identifies files to be migrated from lower to higher levels of storage.

4. The apparatus of claim 1 wherein said data base includes an access cycle table for storing access cycles for each data set, each access cycle including a number of active days and a number of idle days, said access cycle table also including a total cycle count indicating the total number of access cycles observed for each data set and a weighted count indicative of the number of times a particular access cycle is observed, said access cycle table being used by said first calculating means to calculate said first next reference date and said first confidence level.

5. The apparatus of claim 4 wherein said means for creating and maintaining includes means for comparing a current access cycle to said stored access cycles for a particular data set, means for incrementing said weighted count for that access cycle by the total cycle count for that data set in the event of a match, and means for saving the current access cycle and assigning it a weighted count equal to the total cycle count for that data set if a match is not found.

6. The apparatus of claim 5 wherein said means for saving stores the current access cycle and assigned weighted count in said access cycle table if said access cycle table has space available for that data set, and replaces the access cycle having the lowest weighted count if said access table has no more space available for that data set.

7. The apparatus of claim 4 wherein said first means for calculating includes means for adding the weighted counts from all the cycle table entries for a particular data set to determine a total weighted count, first means for scanning the cycle table entries from the highest weighted count to the lowest weighted count to locate the row in the access cycle table at which the scanned sum of weighted counts is at least ninety percent of the total weighted count, and second means for scanning upward from said located row to identify the row in the access cycle table in which the number of idle days meets or exceeds the number of idle days in the current access cycle.

8. The apparatus of claim 7 wherein said first means for calculating calculates said first next reference date by adding one plus the number of idle days from the identified row to the last reference date for the data set.

9. The apparatus of claim 8 wherein said first means for calculating calculates said first confidence level based on the output from said second means for scanning and said total cycle count.

10. The apparatus of claim 1 wherein said data base includes a name table for storing a count of the number of data sets found having a common prefix and the frequency of access to those data sets, said name table being used by said second means for calculating to calculate said second next reference dates and said second confidence levels.

11. The apparatus of claim 1 wherein said data base includes an age table for storing the number of data sets found, the age of each data set, and whether the data set was accessed since the last cycle, said age table being used by said second means for calculating to calculate said second next reference dates and said second confidence levels.

12. A pattern based space management method for use on a computer system having at least two levels of hierarchical storage, said method comprising the steps of:

creating and maintaining a data base containing size information and an access cycle table for storing access cycles for each data set residing on the computer system, each access cycle including a number of active days and a number of idle days, said access cycle table also including a total cycle count indicating the total number of access cycles observed for each data set and a weighted count indicative of the number of times a particular access cycle is observed, and wherein the step of creating and maintaining a data base further includes the steps of:

comparing a current access cycle to said stored access cycles for a particular data set;

incrementing said weighted count for that access cycle by the total cycle count for that data set in the event of a match; and saving the current access cycle and assigning it a weighted count equal to the total cycle count for that data set if a match is not found;

calculating a first next reference date for certain of the data sets and a first confidence level for each of said first next reference dates from information in said data base;

defining an amount of the highest level storage space which is to remain available;

identifying which data sets should be migrated between the storage levels of the computer system based on said first next reference dates, said first confidence levels, the sizes of the data sets, and the amount of highest level storage space which is to remain available; and migrating the identified data sets.

13. The method of claim 12 wherein said step of saving includes the steps of storing the current access cycle and assigned weighted count in said access cycle table if said access cycle table has space available for that data set, and replacing the access cycle having the lowest weighted count if said access table has no more space available for that data set.

14. The method of claim 12 wherein said step of calculating a first next reference includes the steps of:

adding the weighted count values from all the cycle table entries for a particular data set to determine a total weighted count;

scanning the cycle table entries from the highest weighted count to the lowest weighted count to locate the row in the access cycle table at which the scanned sum of weighted counts is at least ninety percent of the total weighted count;

scanning upward from said located row to identify the row in the access cycle table in which the number of idle days meets or exceeds the number of idle days of the current access cycle; and adding one plus the number of idle days from the identified row to the last reference date for the data set.

15. The method of claim 14 wherein the step of calculating said first confidence level includes the step of setting the confidence level to zero if the total cycle count for the data set is less than a first predetermined number.

16. The method of claim 14 wherein the step of calculating said first confidence level includes the step of setting the confidence level to zero if the data set has a number of idle days in the current cycle that is greater than the number of idle days recorded in the access cycle table for that data set.

17. The method of claim 14 wherein the step of calculating said first confidence level includes the step of setting the confidence level to zero if the data set is still in the active portion of its cycle.

18. The method of claim 14 wherein the step of calculating said first confidence level includes the step of setting the confidence level to 100% if the upward scanning step produces a match.

19. The method of claim 18 wherein the step of calculating said first confidence level includes the step of decreasing the confidence level from 100% by 2% for every cycle less than ten.

* * * * *